United States Patent [19]
Faruque

[11] Patent Number: 6,128,497
[45] Date of Patent: Oct. 3, 2000

[54] HIGH CAPACITY CELL PLANNING BASED ON FRACTIONAL FREQUENCY REUSE

[75] Inventor: Saleh Faruque, Plano, Tex.

[73] Assignee: Nortel Networks Limited, Montreal, Canada

[21] Appl. No.: 09/038,372

[22] Filed: Mar. 10, 1998

Related U.S. Application Data

[60] Provisional application No. 60/067,416, Dec. 3, 1997.

[51] Int. Cl.[7] .................................................. H04Q 7/20
[52] U.S. Cl. ........................................ 455/447; 455/446
[58] Field of Search .................................. 455/446, 447, 455/448, 449

[56] References Cited

U.S. PATENT DOCUMENTS

| | | | |
|---|---|---|---|
| 5,067,147 | 11/1991 | Lee | 455/447 |
| 5,073,971 | 12/1991 | Schaeffer | 455/447 |
| 5,111,534 | 5/1992 | Benner | 455/447 |
| 5,365,571 | 11/1994 | Rha et al. | 455/447 |
| 5,722,043 | 2/1998 | Rappaport et al. | 455/447 |
| 5,734,983 | 3/1998 | Faruque | 455/446 |
| 5,802,474 | 9/1998 | Faruque | 455/447 |

*Primary Examiner*—Nay Maung
*Assistant Examiner*—Quochien B. Vuong
*Attorney, Agent, or Firm*—John D. Crane

[57] ABSTRACT

The fractional frequency reuse plan groups available frequencies into 16 frequency groups. These frequency groups are then allocated to a group of sectors such that a four by four matrix results. The top two rows of the matrix are alternating odd numbered frequency groups while the bottom two rows of the matrix are alternating even numbered frequency groups. This group of frequencies is then reused in such a way that three adjacent reuses of a frequency group forms an apex of a triangle. Each reuse on the triangle appears as back-to-back, radiating in different direction, 120° apart. This frequency reuse plan generates an N=5.333 system.

11 Claims, 3 Drawing Sheets

HIGH CAPACITY CELL PLANNING BASED ON FRACTIONAL FREQUENCY REUSE

RELATED APPLICATIONS

This is a 35 U.S.C. § 111(a) application of provisional U.S. patent application Ser. No. 60/067,416, filed Dec. 3, 1997.

BACKGROUND OF THE INVENTION

1. Field of the Invention

The present invention relates to radio communications. More particularly, the present invention relates to cellular radiotelephone communications.

2. Description of the Related Art

Cellular radiotelephone systems enable mobile subscribers to communicate with landline telephone networks while moving through a geographical area. High density, high capacity cells in typical cellular radiotelephone systems are made up of directional antennas centrally located in the cell. Each antenna radiates into a different sector of the cell. A number of these cells are combined to form the cellular radiotelephone system.

The cell shapes are determined by both the radiation patterns of the antennas and the local conditions at the cell site. Cells, however, are typically idealized as hexagonal patterns since such a pattern closely approximates the ideal antenna radiation pattern.

Cellular radiotelephone systems use different channel frequencies for each mobile subscriber. The transmission from the mobile to the cell uses one frequency while the transmission from the cell to the mobile user uses another frequency. These two frequencies are not used by other nearby mobiles as this would lead to interference on the channel and a reduction in signal quality. This interference is referred to in the art as co-channel interference.

Another type of interference experienced by mobile subscribers is adjacent channel interference. This interference is due to the energy slipover between adjacent channels.

Both types of interference affect the signal quality, referred to as the carrier to interference ratio ($^C/_I$). This ratio is the signal strength of the received desired carrier to the signal strength of the received interfering carriers. A number of physical factors can also affect $^C/_I$ in cellular systems including: buildings, geography, antenna radiation patterns, mobile traffic transmitting power, and mobile traffic location within the cell.

Due to the low power of the cell's transmitters, the same frequencies can be reused in other cells, referred to as co-channel cells, in the same geographical area. Greater frequency reuse allows more mobile traffic to use the cellular system. There are, however, constraints on the location of the co-channel cells. Even though the transmitters are typically low power, placing co-channel cells too close may cause interference.

Frequency planning optimizes spectrum usage, enhances channel capacity and reduces interference. A frequency plan also ensures adequate channel isolation to avoid energy slipover between channels, so that adjacent channel interference is reduced. Moreover, an adequate repeat distance is provided to an extent where co-channel interference is acceptable while maintaining a high channel capacity. In order to accomplish these diverse requirements, a compromise is generally made so that the target $^C/_I$ performance is acquired without jeopardizing the system capacity. However, the existing frequency planning schemes do not always permit this. As a result, with growing cellular subscribers, today's cellular networks are overloaded and do not provide an adequate service.

A prior art method of symmetrical frequency planning begins with two integers, i and j, which are referred to as shift parameters. The frequency plan is established by starting with a reference cell and moving over i cells along the chain of cells. After reaching the $i^{th}$ cell, a counter-clockwise turn of 60° is made and another move of j cells is made. The $j^{th}$ cell can safely be a co-channel cell. The frequency plan can also be established by moving j cells before turning i cells or by turning 60° clockwise.

After all the possible co-channel cells of the initial cell are laid out, another reference cell is chosen and the procedure is repeated. This entire procedure is repeated as often as necessary to establish the frequency plan of the entire metropolitan cellular system.

The cells thus established by the above procedure form a reuse pattern of $i^2+ij+j^2$ cells. The number of cells in this reuse pattern is a predominant concern of the cellular industry since this number determines how many different channel groups can be formed out of the frequency spectrum allocated to cellular radiotelephones. A low number of cells in a reuse pattern means more channel groups can be formed and more users accommodated.

The classical cellular architecture planning principle is shown in FIG. 1. This planning principle enables all the co-channel interferers to be equidistant from each other, resulting in a carrier to interference ratio of:

$$\frac{C}{I} = 10\log\left[\frac{1}{k}\left(\frac{D}{R}\right)^{\gamma}\right] \quad (1)$$

where:

$\frac{D}{R} = \sqrt{3N}$ $D$ = Frequency reuse distance $R$ = Cell radii;

$k$ = Total number of interferers; and $N = i^2 + ij + j^2$.

Shift parameters i and j are 60° apart. In general, k=6 for the OMNI plan, illustrated in FIG. 1, and k=3 for a 120°, 3 sectored plan, illustrated in FIG. 2. From FIGS. 1 and 2 it is obvious that $^C/_I$ performance depends on two basic parameters: the number of interferers and the reuse distance. The effective number of interferers is reduced 50% in the 120° sectorized system. There is a need to further reduce the $^C/_I$ interference and enhance capacity.

SUMMARY OF THE INVENTION

The present invention encompasses a process for fractional frequency allocation in a cellular radiotelephone system. The cellular radiotelephone system has a plurality of available frequencies and a plurality of cells.

The process forms a group of cells from the plurality of cells. This group of cells is comprised of a plurality of tri-cell clusters having directional antennas located in the center of each tri-cell cluster.

The plurality of available frequencies are organized into a plurality of frequency groups. In the preferred embodiment, 26 frequencies are assigned to each frequency group, yielding over 30% more capacity than the existing N=7 frequency plan.

Each frequency group is assigned to a different sector of the group of cells. The frequency groups are then reused in such a way that the first use of a frequency group and the second and third reuses of that same frequency group form apexes of one triangle. Each frequency reuse is arranged such that it is pointing back-to-back with the other triangle apexes. This back-to-back triangular formation of frequency reuse eventually reduces the total number of interferers to two. As a result, the effective $^C/_I$ is reduced while the capacity is enhanced.

DETAILED DESCRIPTION OF THE PREFERRED EMBODIMENT

Figure 1:
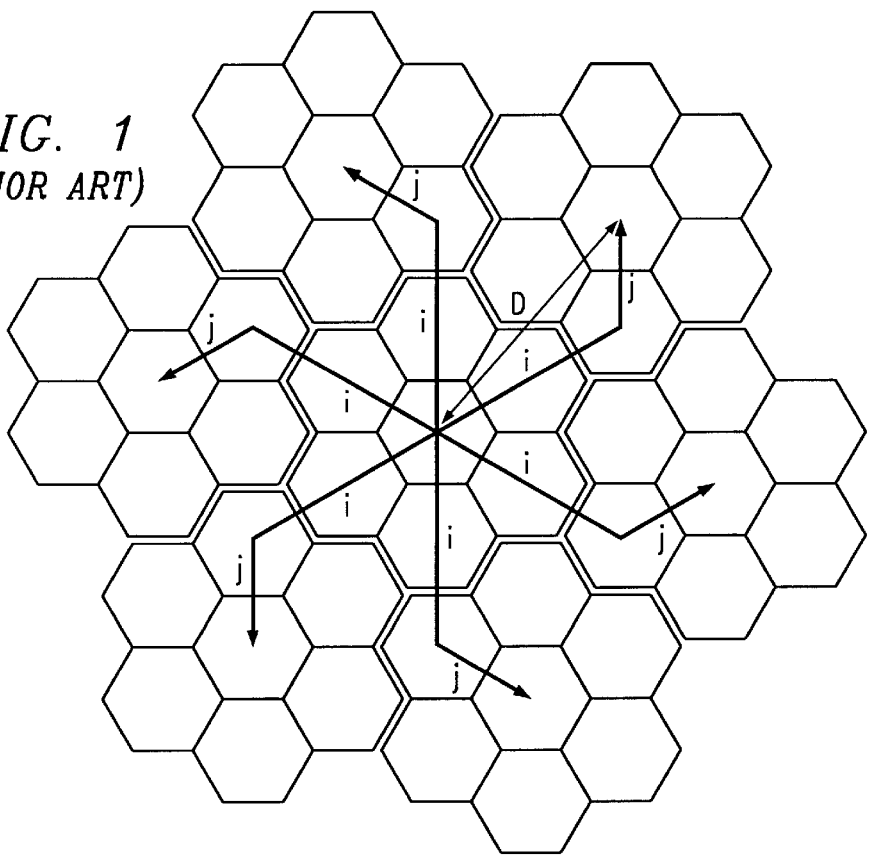
FIG. 1 shows a prior art N=7 OMNI plan.
Figure 2:
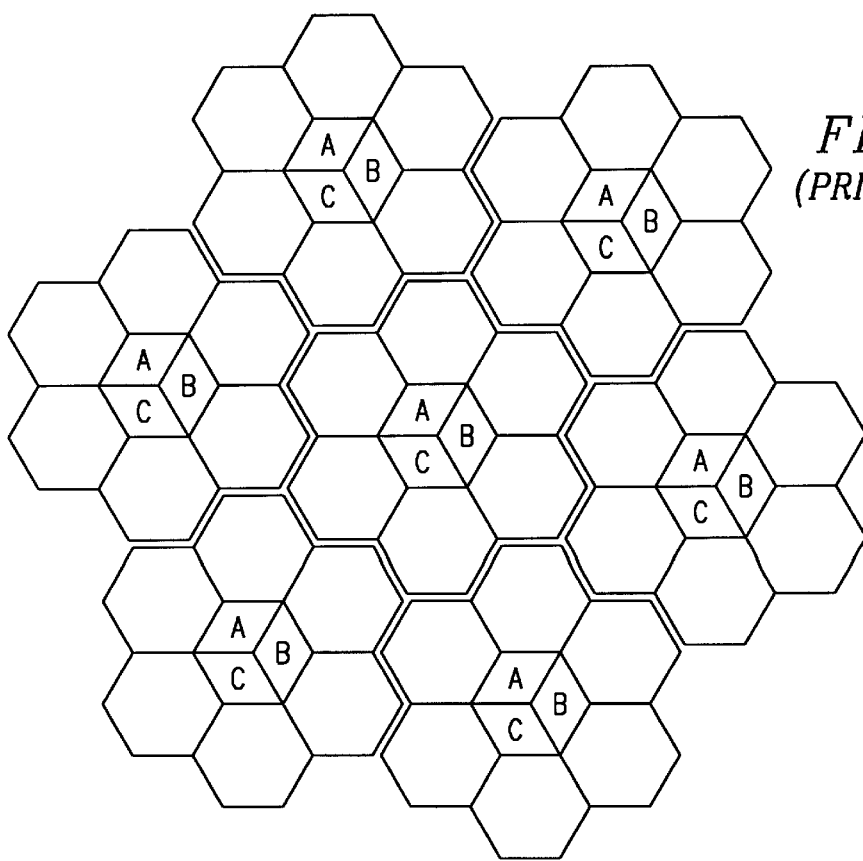
FIG. 2 shows a prior art N=7 sectorized plan.
Figure 3:
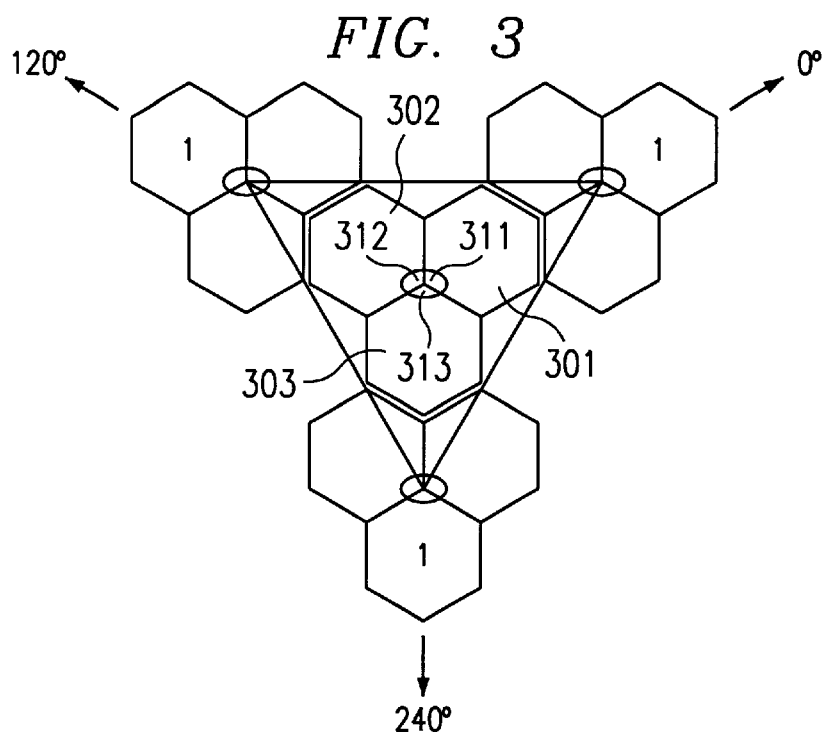
FIG. 3 shows the back-to-back triangular formation frequency reuse of the present invention.

The fractional frequency reuse plan of the present invention provides a cellular radiotelephone system having N=5.333 capacity. The concept of the fractional frequency plan is based on a back-to-back triangular formation of same frequencies in a three sectored plan. This is based on clusters of three identical sectors (301–303), driven from the center of the tri-cell cluster. This concept is illustrated in FIG. 3.

Each cell is comprised of three sectors (301–303) and the directional antennas (311–313) in the center of the cluster. Each antenna (311–313) radiates into a 120° sector of the three-sectored cell.

The N=5.333 frequency plan of the present invention is based on dividing up the available channels into sixteen frequency groups or a multiple of sixteen frequency groups. These groups are then distributed evenly among sectors in a 4×4 array as shown below:

$$
\begin{array}{cccc}
1 & 3 & 5 & 7 \\
9 & 11 & 13 & 15 \\
2 & 4 & 6 & 8 \\
10 & 12 & 14 & 16
\end{array}
\quad (2)
$$

The top 4×2 of the array being alternate odd frequency groups and the bottom 4×2, alternate even frequency groups.

Figure 4:
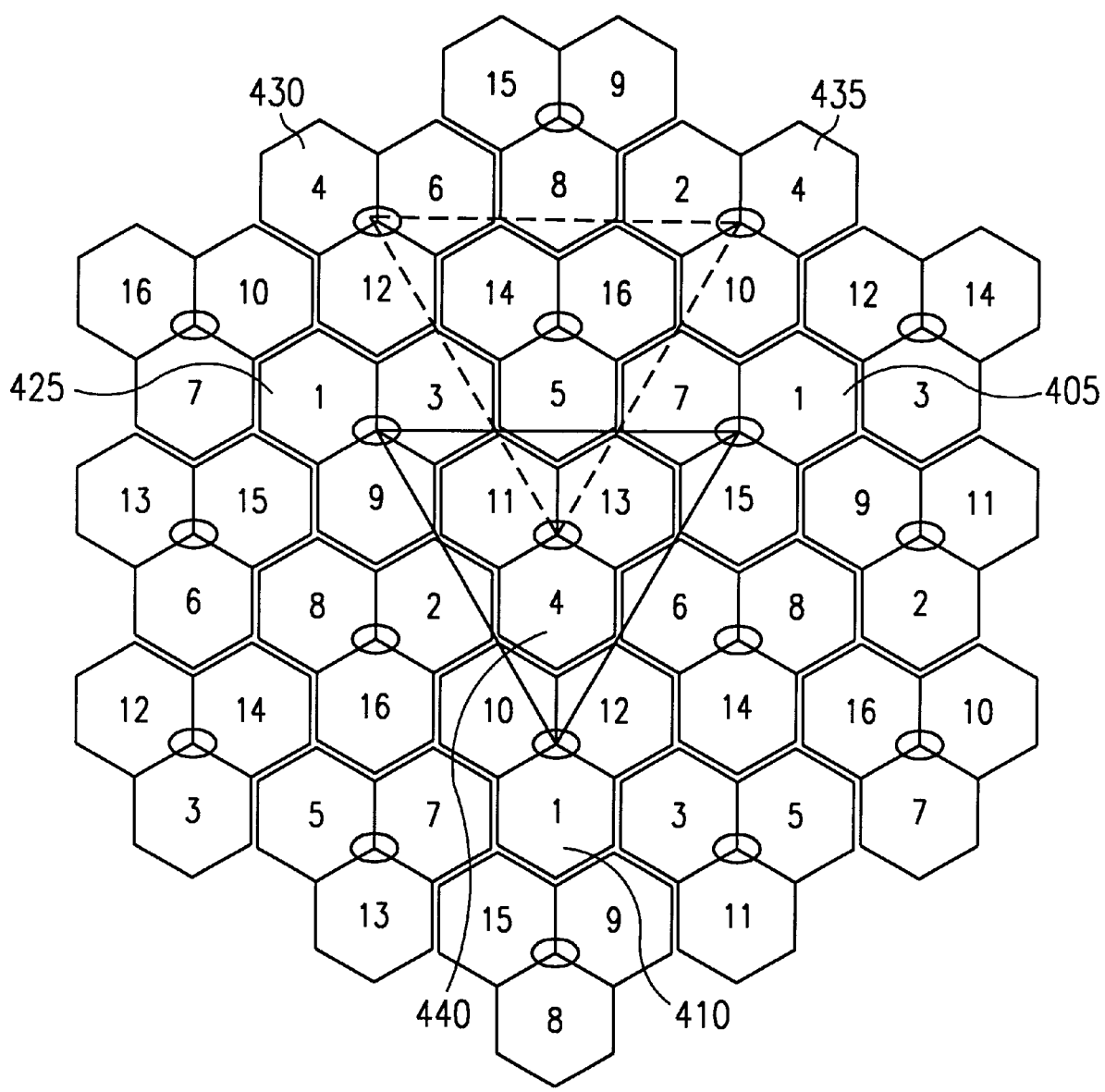
FIG. 4 shows a cellular layout of the fractional frequency plan of the present invention.

Referring to FIG. 4, each frequency group is assigned to a different sector, which automatically generates a back-to-back triangular formation of the same frequencies throughout the entire network. The frequency reuse plan, as illustrated in FIG. 4, is then expanded as needed, in areas surrounding the first use, as required to cover a geographical area.

FIG. 4 also illustrates the triangular reuse of frequencies. For example, focusing on frequency group 1, this frequency group is reused (405) after frequency group 7 on the same line as the first use of frequency group 1 (425). Frequency group 1 is also reused at a lower point (410) from the first two uses (405 and 425) such that a triangle is formed when connecting each adjacent frequency group reuse. Each adjacent frequency reuse of the triangle is at a triangle apex and is radiating in a different direction.

FIG. 4 also illustrates another triangular reuse example using frequency group 4. By connecting each adjacent reuse of frequency group 4 (430, 435, and 440), a triangle is formed with the reuses at the apexes and radiating in different directions.

The fractional frequency plan of the present invention reduces interference such that the effective number of interferers is reduced to two. The $^C/_I$ of this plan is determined as follows:

$$\frac{C}{I} \approx 10\log\left[\frac{1}{2}\left(\sqrt{3N}\right)^\gamma\right] + \Delta dB \approx 21\ dB \quad (3)$$

where N=5.333, γ=4, and AdB is due to the antenna side-to-side ratio (>10 dB for typical sector antennas). The pathloss slope, γ, also referred to in the art as the propagation constant, is the rate of decay of signal strength as a function of distance. This constant is well known in the art and is discussed above.

The $^C/_I$ objective for TDMA is to get a value that is equal to or greater than 18 dB. Obviously, since the present invention provides a $^C/_I$ of 21 dB, this objective is met.

The channel capacity provided by the N=5.333 frequency layout plan of the present invention is determined by dividing the total number of frequency groups, 416, by the number of sectors, 16. In the present case, the frequency layout plan provides 416/16=26 channels per sector.

Another metric of cellular efficiency is the trunking efficiency. Trunking efficiency is defined as:

$$\text{Efficiency (\%)} = \frac{\text{Traffic in Erl.}}{\text{Number of Channels}} \times 100. \quad (4)$$

Figure 5:
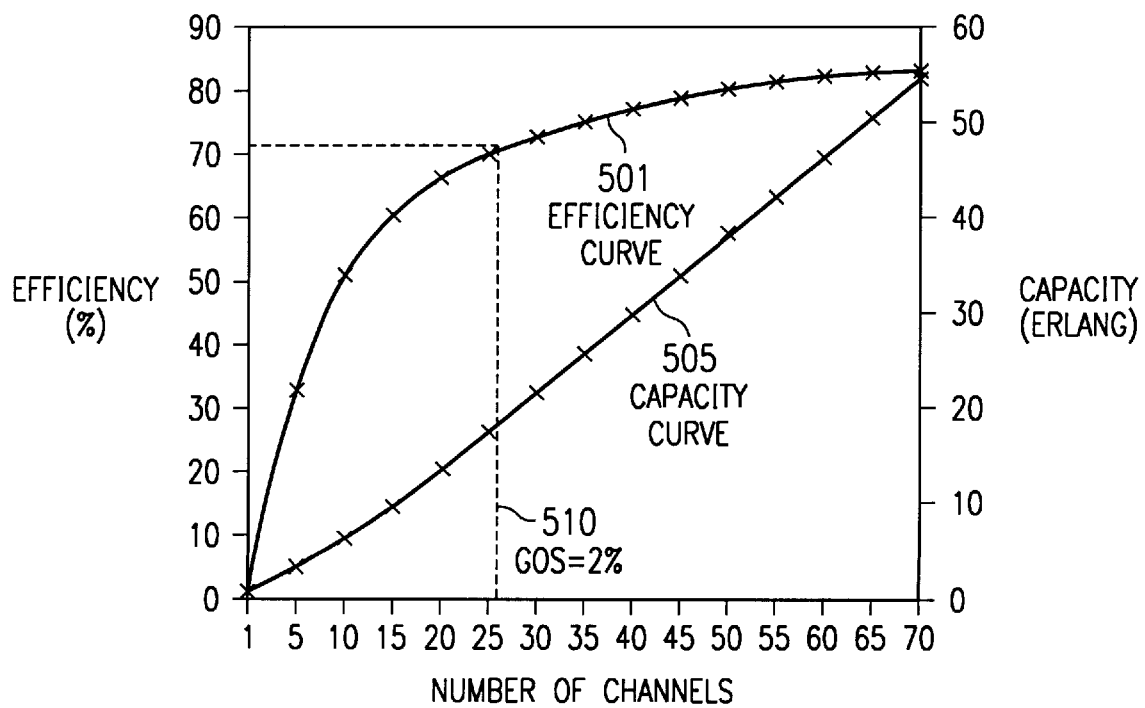
FIG. 5 shows the trunking efficiency of the present invention.

FIG. 5 illustrates a plot of efficiency (501) and capacity (505) in Erlang versus the number of RF channels/sector in the cellular system. This plot shows that the trunking efficiency is optimum when the number of channels/sector is greater than 20 and the $^C/_I$ is acceptable. The present invention, therefore, provides an optimum trunking efficiency with 26 channels/sector and an acceptable $^C/_I$.

The standard Grade of Service (GOS) for TDMA is 2% and is well known in the art. This means that it is acceptable for 2% of the calls in a cellular service provider's area to be blocked by some means such as buildings, terrain, etc. Using this GOS, the present invention provides 45 Erlang per sector or 3×45=135 Erlang per cell, as determined from the standard cellular traffic table that is well known in the art. This is an improvement over the prior art.

The 2% GOS (510) is illustrated in FIG. 5. With a GOS of 2% plotted (510) on the graph, the efficiency is 72% at 26 RF channels/sector.

Since the cells of the present invention are excited from the corner, 120° apart, the antenna configuration and its directivity play an important role in determining system performance, such as distance between co-channels, co-channel interference, and adjacent channel interference.

The repeat distance between co-channels is determined by the equation $$\frac{D}{R} = \sqrt{3N}.$$

Since, in the frequency lay out of the present invention, N=5.333, $$\frac{D}{R} = \sqrt{3 \cdot 5.333} = \sqrt{15.999} \approx 4.$$

The co-channel interference (CCI) and adjacent channel interference (ACI) of the present invention can be further reduced in alternate embodiments by using high gain antennas that have a larger front-to-back ratio.

I claim:

1. A method for fractional frequency allocation in a cellular radiotelephone system, the cellular radiatelephone system having a plurality of available frequencies and comprising a plurality of cells, the method comprising the steps of:

forming a group of cells comprising a subset of the plurality of cells;

grouping the plurality of available frequencies into a plurality of frequency groups;

assigning a different frequency group, of the plurality of frequency groups, to each cell of the group of cells; and reusing the frequency groups within the group of cells such that a first use of a first frequency group and a first and second reuse of the first frequency group are each located at a respective apex of a first triangle, each first frequency group use radiating 120° from the other use, there being no other triangles having apexes coincident with use of the first frequency group, which other triangles are congruent with or similar to the first triangle and which abut, are adjacent to, or are proximate to the first triangle.

2. The method of claim 1 wherein the group of cells is comprised of a plurality of tri-cell clusters, each cell of the tri-cell cluster being radiated by a directional antenna in the center of the tri-cell cluster.

3. A method for fractional frequency reuse in a cellular radiotelephone system, the cellular radiotelephone system having a plurality of available frequencies and comprising a plurality of cells, the method comprising the steps of:

forming a tri-cell cluster comprising a subset of the plurality of cells;

forming a group of cells comprising a plurality of tri-cell clusters;

grouping the plurality of available frequencies into a plurality of frequency groups;

assigning a different frequency group of the plurality of frequency groups to each cell of the group of cells in a manner such that odd numbered frequency groups comprise a first and second row of cells and even numbered frequency groups comprise a third and fourth row of cells; and reusing the frequency groups such that three adjacent reuses of a first frequency group form a triangle, each reuse radiating in a direction that is 120° from the other two uses.

4. The method of claim 3 wherein the step of reusing includes reusing each adjacent frequency group reuse in a different direction than the other two frequency group reuses.

5. The method of claim 3 wherein the step of reusing includes reusing the groups cells such that an N=5.333 cellular radiotelephone system results.

6. A method of allocating fractional frequencies in a cellular radiotelephone system, the system having a plurality of available frequencies and a plurality of cells, the method comprising:

ordering the plurality of cells as rows of abutting cells and columns of abutting cells, the centers of the cells in a row being offset from the centers of the immediately adjacent cells in the rows on either side thereof, the offset being in the direction in which the rows extend, the columns extending in a direction which is oblique to the rows, and the centers of the cells in a column being offset in a direction parallel to the columns from the centers of the immediately adjacent cells in the columns on either side thereof;

forming similar cell clusters of three cells each, two of the cells in each cluster being from one row and one cell being from an adjacent row, each cell in a cluster abutting the other two cells of the cluster so that there is defined a cluster center which is a point common to all three cells in a cluster;

locating three directional antennae at the center of each cluster, each antenna of each cluster being capable of radiating energy over a respective one of the cells in the cluster; and assigning odd frequency groups to first and second rows of cells and even frequency groups to third and fourth rows of cells, and then extending frequency assignment along each row and column and above and below the rows and columns, the odd frequencies repeating in the first and second rows and the even frequencies repeating in the third and fourth rows, there being below the fourth row additional first, second, third and fourth rows, and above the first row other fourth, third, second and first rows, so that each antenna at the center of each cluster of cells radiates a frequency group that is different from the frequency group radiated by the other two antennae of the cluster and the three frequency groups of any cluster are not radiated from another cluster in the vicinity, and so that reuses of any frequency group occur as three adjacent uses thereof which define the apices of a triangle and the direction of radiation of the frequency groups at the apices are 120° apart.

7. A method as in claim 6, wherein:

the frequency group assigning step is achieved by creating a matrix of numbers the first two rows of which comprise serial odd numbers and the third and fourth rows of which comprise serial even numbers, the matrix also having number-containing columns, each number identifying one of the frequency groups; and mapping the numbers of the matrix directly onto respective individual cells of the plurality of cells by assigning the numbers in each matrix row to a corresponding cell row and, as a result, assigning the numbers in each matrix column to a corresponding cell column.

8. A method as in claim 7, wherein:

the number of frequency groups is sixteen, and the matrix comprises four rows and four columns.

9. A method as in claim 6 wherein N=5.33.

10. A method of allocating fractional frequencies in a cellular radiotelephone system, the system having a plurality of available frequencies and a plurality of nominally hexagonally configured cells, the method comprising:

ordering the cells as rows of abutting cells and columns of abutting cells, the centers of the cells in a row being offset from the centers of the immediately adjacent cells in the rows on either side thereof, the offset being in the direction in which the rows extend, the columns extending in a direction which is oblique to the rows, and the centers of the cells in a column being offset in a direction parallel to the columns from the centers of the immediately adjacent cells in the columns on either side thereof;

forming cell clusters of three cells each, two of the cells in each cluster being from one row and one cell being from an adjacent row, each cell in a cluster abutting the other two cells of the cluster so that there is defined a cluster center which is a point common to all three cells in a cluster, the centers of the cells in each cluster defining a first triangle having a base parallel to the rows and a vertex separated from the base in a direction normal to the base and the rows;

locating three directional antennae at the center of each cluster, each antenna of each cluster being capable of radiating energy over a respective one of the cells in the cluster;

assigning alternate odd frequency groups to first and second rows of cells and alternate even frequency groups to third and fourth rows of cells, and then extending frequency assignment along each row and column and above and below the rows and columns, the odd frequencies repeating in the first and second rows and the even frequencies repeating in the third and fourth rows, there being below the fourth row additional first, second, third and fourth rows, and above the first row other fourth, third, second and first rows, so that each antenna at the center of each cluster of cells radiates a frequency group that is different from the frequency group radiated by the other two antennae of the cluster and the three frequency groups of any cluster are not radiated from another cluster in the vicinity, and so that reuse of any frequency group occurs as three adjacent uses thereof which define the apices of a second triangle and the direction of radiation of the frequency groups at the apices are 120° apart, the first and second triangles being similar with their three pairs of sides being generally parallel.

11. A method as in claim 10, wherein reuse results in $N=5.33$.

* * * * *